(No Model.)
T. JOHNSTON.
BICYCLE.
No. 314,335. Patented Mar. 24, 1885.
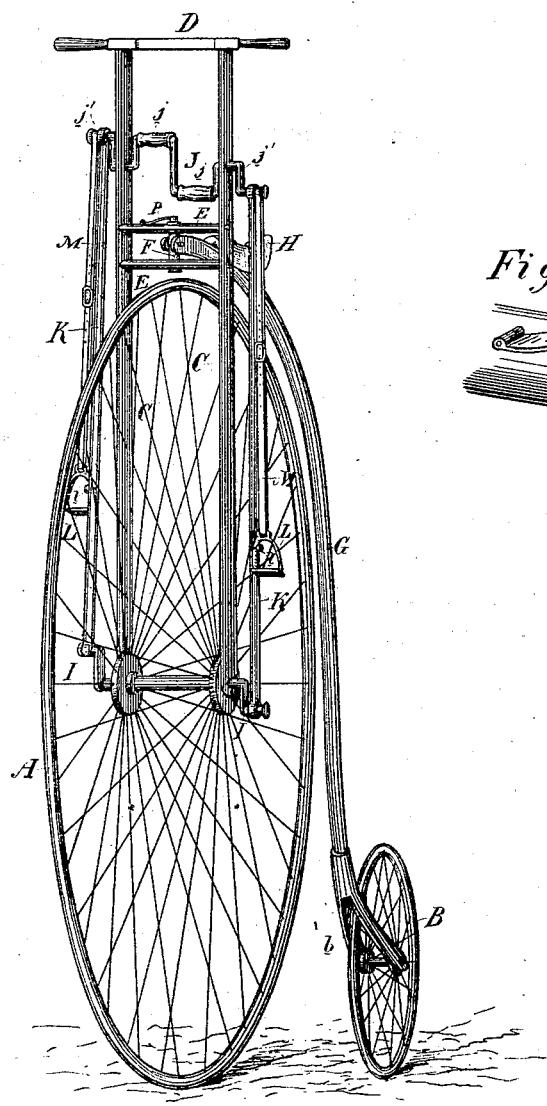
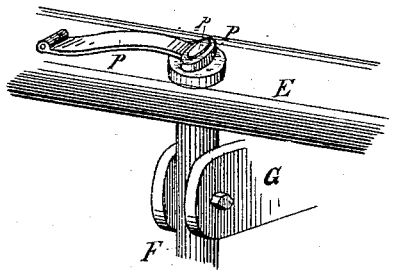

UNITED STATES PATENT OFFICE.

THOMAS JOHNSTON, OF SAN FRANCISCO, CALIFORNIA.

BICYCLE.

SPECIFICATION forming part of Letters Patent No. 314,335, dated March 24, 1885.

Application filed December 16, 1884. (No model.)

*To all whom it may concern:*

Be it known that I, THOMAS JOHNSTON, of the city and county of San Francisco, State of California, have invented an Improvement on a Bicycle; and I hereby declare the following to be a full, clear, and exact description of the same.

My invention relates to the class of velocipedes or bicycles and to certain new and useful improvements therein; and my invention consists in a hand-crank located above the head of the machine, and in a connection between said crank and the cranks on the axle of the front wheel, said connections having stirrups upon them for the reception of the feet, whereby, through the joint action of the hands and feet, the bicycle is propelled.

It also consists in a connection between the head and backbone, as I shall describe.

The object of my invention is to provide a machine of this class which is adapted to be driven by both hands and feet, and is simple in construction.

Referring to the accompanying drawings, Figure 1 is a perspective view of my bicycle. Fig. 2 is a detail view showing the locking mechanism of the steering-center.

A is the front wheel, and B is the rear wheel. C are the front forks, in the lower ends of which suitable boxes are provided, in which the axle of the front wheel is journaled in the usual manner. The forks extend upwardly and terminate in a handle, D.

Between the forks, just above the wheel, are two cross-bars, E, between which a vertical bolt, F, extends. This bolt forms the steering center or pin, being adapted to turn in its bearings, and it may be tightened down sufficiently by means of a nut on its lower end.

The backbone G, in the lower end of which the rear wheel is attached by the usual rear forks, b, has its upper end firmly bolted to the bolt F, thus forming the necessary pivoted steering head or connection between the two wheels.

H is the saddle, secured to the backbone in any suitable manner. I are the driving-cranks of the front wheel, keyed to the axle. Across the upper end of the fork, between the steering-head and the handle D, is a crank-shaft, J, so bent as to form oppositely-located cranks $j$, between the forks and the cranks $j'$, on each end.

Extending between the lower cranks, I, and the cranks $j'$ above are the straight connecting-rods K, upon which are secured foot rests or stirrups L. These stirrups are adapted to be vertically adjusted according to the length of the leg of the rider. This is accomplished by means of straps M, secured to the stirrups and the cranks $j'$ above, said straps being provided with buckles, whereby they may be lengthened or shortened; but the stirrups L are further steadied and secured by means of set-screws $l$, which pass through their tops and bind them to the connecting-rods K.

The operation of the machine is as follows: The rider gains his seat in the saddle in the usual manner. He places his hands upon the middle cranks, $j$, and his feet in the stirrups L. By the rotary movement of the hands and the reciprocating movement of the feet the machine is driven. In this way the rider is enabled to use both hands and feet as propelling-powers. When he desires to steer his machine, he can do so by grasping the ordinary handle, D; or when he has attained sufficient skill he can accomplish this result by the crank-shaft J.

This invention, which lies, principally, in the employment of the hand-crank and a connection between said crank and the crank of the front wheel, may be applied to other forms of velocipedes, such as tricycles, &c.

I provide a means for holding the two wheels in line by locking the steering-center, whereby the velocipede may be made to travel straight, and yet can be steered, when desired, by releasing the locking mechanism.

Upon the top cross-bar, E, is hinged or pivoted a bar or strap, P, having a socket in its end, which is adapted to fit over a lug, $p$, on the head of the steering-center bolt F. This strap when in engagement locks the steering-center, but it may be raised when it is desired to steer.

Having thus described my invention, what I claim as new, and desire to secure by Letters Patent is—

1. In a bicycle or velocipede, the front wheel, A, having cranks I and forks C, in combination with the crank-shaft J, mounted in the forks above the wheel, and having middle cranks, $j$, and end cranks, $j'$, the rods K, connecting said cranks $j'$ with the cranks I, and the vertically-adjustable stirrups L upon rods K, substantially as herein described.

2. A bicycle or velocipede consisting of the front wheel, A, having cranks I and forks C, with handle D, a rear wheel or wheels, a backbone connecting the rear wheel or wheels with the forks of the front wheel by means of a suitably-pivoted head or steering-center, the seat or saddle H, the crank-shaft J, with its cranks $j\ j'$, the rods K, connecting cranks I $j'$, and the vertically-adjustable stirrups L upon said rods, and the adjusting-straps M, substantially as herein described.

3. In a bicycle or velocipede, the front wheel, A, having forks C, with cross-bars E, in combination with the backbone G, the steering-bolt F, to which the backbone is secured, said bolt being mounted in the cross bars, and having a top lug, $p$, and the locking-strap P, hinged on the upper cross-bar, and provided with a socket engaging the lug $p$ of the steering-bolt, substantially as herein described.

In witness whereof I have hereunto set my hand.

THOMAS JOHNSTON.

Witnesses:
S. H. NOURSE,
W. F. BOOTH.